(12) United States Patent
Valley et al.

(10) Patent No.: US 9,985,534 B2
(45) Date of Patent: May 29, 2018

(54) METHOD AND CIRCUITRY FOR CONTROLLING A POWER SUPPLY

(71) Applicant: Texas Instruments Incorporated, Dallas, TX (US)

(72) Inventors: Richard Lee Valley, Nashua, NH (US); Hong Huang, Andover, MA (US); Bharath Balaji Kannan, Merrimack, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days. days.

(21) Appl. No.: 15/414,420

(22) Filed: Jan. 24, 2017

(65) Prior Publication Data

US 2017/0229968 A1 Aug. 10, 2017

Related U.S. Application Data

(60) Provisional application No. 62/291,760, filed on Feb. 5, 2016.

(51) Int. Cl.
*H02M 3/335* (2006.01)
*H02M 1/00* (2006.01)

(52) U.S. Cl.
CPC ......... *H02M 3/33507* (2013.01); *H02M 2001/0019* (2013.01); *H02M 2001/0032* (2013.01); *Y02B 70/16* (2013.01)

(58) Field of Classification Search
CPC .. H02M 3/335; H02M 3/315; H02M 3/33507; H02M 3/3155; H02M 3/33523; H02M 7/53871; H02M 7/48; H02M 7/515; H02M 7/538466; H02M 7/53862; G05F 1/30; G05F 1/33

USPC ....... 363/21.12, 21.15, 21.16, 21.17, 78, 95, 363/97, 131

See application file for complete search history.

(56) References Cited

U.S. PATENT DOCUMENTS

| | | | |
|---|---|---|---|
| 4,459,651 A | 7/1984 | Fenter | |
| 9,209,700 B2* | 12/2015 | Valley | H02M 3/33523 |
| 9,350,249 B2* | 5/2016 | Valley | H02M 1/4258 |
| 2014/0133193 A1 | 5/2014 | Tzeng et al. | |
| 2015/0003121 A1 | 1/2015 | Yang et al. | |
| 2017/0012542 A1* | 1/2017 | Nishijima | H02M 3/33523 |

(Continued)

OTHER PUBLICATIONS

Search Report for PCT Application No. PCT/US17/167531, dated Jun. 29, 2017 (1 page).

*Primary Examiner* — Adolf Berhane
(74) *Attorney, Agent, or Firm* — William B. Kempler; Charles A. Brill; Frank D. Cimino

(57) ABSTRACT

Methods of operating switching power supplies are disclosed. A power supply has a transformer and a switch coupled to the primary side of the transformer for controlling the current flow through the primary side of the transformer. A method includes determining the output voltage of the power supply. A first minimum switching frequency is generated for driving the switch in response to the output voltage being greater than a nominal output voltage and less than a predetermined voltage. A second minimum switching frequency is generated for driving the switch in response to the output voltage being equal to or greater than the predetermined voltage, wherein the first minimum switching frequency is greater than the second minimum switching frequency.

20 Claims, 6 Drawing Sheets

(56) References Cited

U.S. PATENT DOCUMENTS

2017/0288434 A1* 10/2017 Narita .................. H02J 7/0052
2017/0353117 A1* 12/2017 Lombardo ........ H02M 3/33523

* cited by examiner

METHOD AND CIRCUITRY FOR CONTROLLING A POWER SUPPLY

This application claims priority to U.S. provisional patent application 62/291,760 for METHOD OF CONTROL FOR PRIMARY SIDE REGULATED FLYBACK POWER SUPPLIES FOR IMPROVED TRANSIENT RESPONSE of Richard Valley, filed on Feb. 5, 2016.

BACKGROUND

Flyback power supplies include a transformer having a primary side coupled to an input voltage source. The output of a flyback power supply is coupled to the secondary side of the transformer. Output voltage regulation is achieved by controlling the current flow through the primary side of the transformer.

SUMMARY

Methods of operating switching power supplies are disclosed. A power supply has a transformer and a switch coupled to the primary side of the transformer for controlling the current flow through the primary side of the transformer. A method includes determining the output voltage of the power supply. A first minimum switching frequency is generated for driving the switch in response to the output voltage being greater than a nominal output voltage and less than a predetermined voltage. A second minimum switching frequency is generated for driving the switch in response to the output voltage being equal to or greater than the predetermined voltage, wherein the first minimum switching frequency is greater than the second minimum switching frequency.

DETAILED DESCRIPTION

Some flyback power supplies use magnetic feedback, or primary side regulation (PSR), to avoid the cost and component count of other feedback methods. The use of PSR is generally accompanied by the use of switching frequency fold back that is used to maintain high operating efficiency at light loads and to reduce power consumption at "no-load" or standby conditions. Meeting standby power consumption targets requires standby switching frequencies $f_{SW(ST)}$ that are very low, such as 1 kHz-3 kHz for a typical 10 W power supply. In standby mode, the external load of the power supply is zero. Although, to maintain the output voltage level, the power supply operates at a finite load level that is the sum of a small internal preload and the load imposed by the power supply itself. The power supply must be able to reduce its output power delivery to this low level or regulation will be lost with the output voltage starting to rise.

With PSR, the power supply control loop has an inherent delay in its response to load changes that is equal to $1/f_{SW}$, where $f_{SW}$ is the switching frequency of the power supply. During this delay the output voltage of the power supply suffers a droop based on the level of output current and the size of an output capacitor. If a large change in output current occurs at the beginning of this delay, then the droop can be unacceptably large. This problem is enhanced in situations of repeated load changes. Increasing the size of the output capacitor is undesirable for cost and size reasons.

Figure 1:
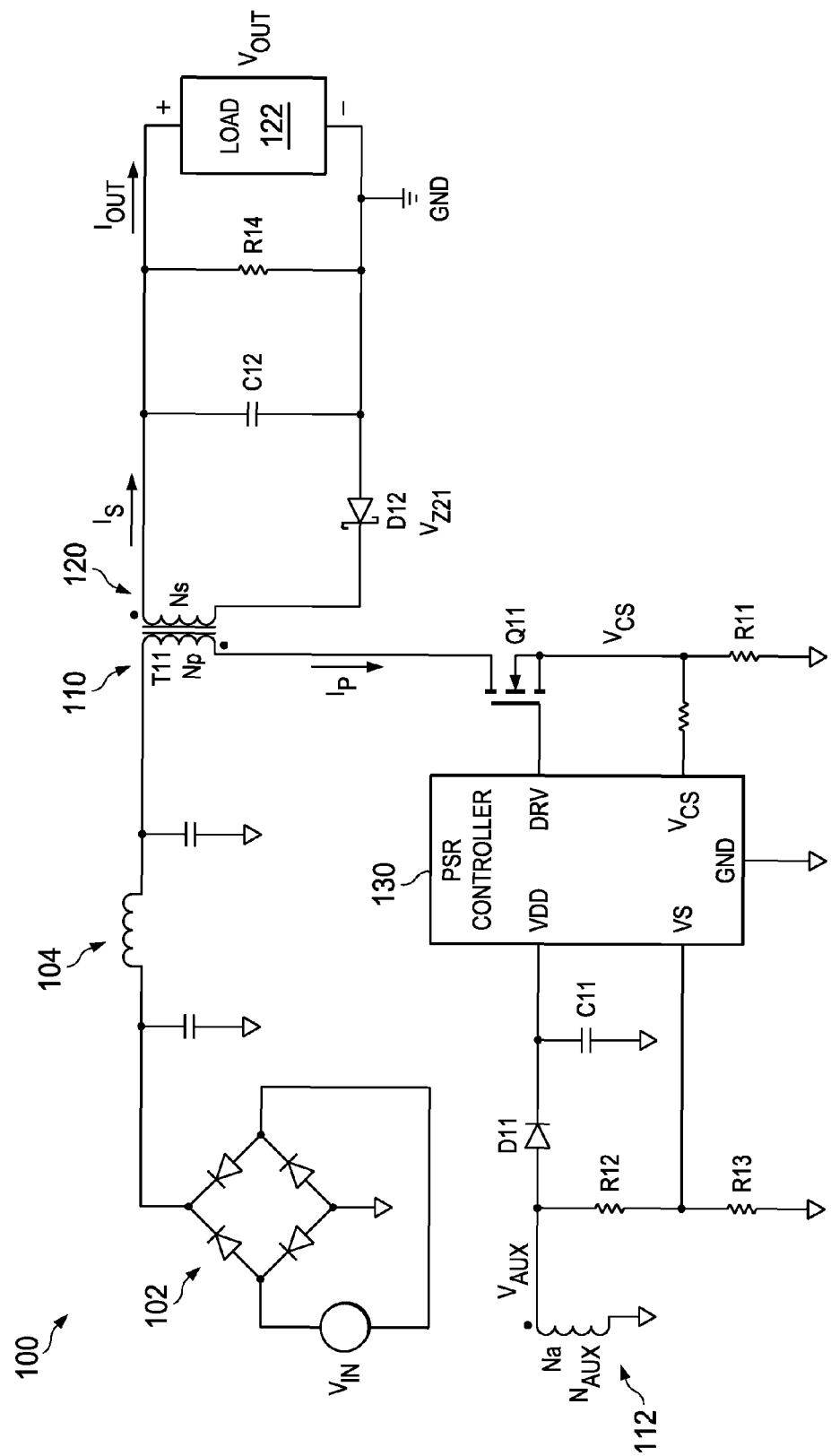
FIG. 1 is schematic diagram of an example of a flyback power supply.

FIG. 1 is a schematic diagram of an example of a flyback power supply 100. The power supply 100 is a switching power supply that converts an AC input voltage $V_{IN}$ to a DC output voltage $V_{OUT}$. The power supply 100 includes a bridge rectifier 102 that converts the AC input voltage $V_{AC}$ to a rectified voltage. The output of the bridge rectifier 102 is coupled to a filter 104. The output of the filter 104 is coupled to the primary side 110 of a transformer T11 that has $N_P$ windings. The primary side 110 of the transformer T11 also includes an auxiliary winding 112 that has $N_{AUX}$ windings and is used by the power supply 100 to generate the operating voltage VDD of the power supply 100. The auxiliary winding 112 generates a voltage $V_{AUX}$ during operation of the power supply 100.

The primary side 110 of the transformer T11 is coupled in series to a switch Q11, a resistor R11, and to a ground node. The ground node may be a potential other than the voltage VDD. In the example of FIG. 1, the switch Q11 is a transistor, such as a field-effect transistor (FET). The state of the transistor Q11 is set by a gate voltage on the transistor Q11. The current flow through the switch Q11 is the current flow through the primary side 110 of the transformer T11 and is referred to herein as the current $I_P$. The current $I_P$ flowing through the resistor R11 generates a current-sensing voltage $V_{CS}$ that is measured to determine the current $I_P$ as described herein.

The auxiliary winding 112 is coupled to a converter consisting of a capacitor C11 and a diode D11 that converts the auxiliary voltage $V_{AUX}$ to the operating voltage VDD. The auxiliary voltage $V_{AUX}$ is sampled by way of a sampling voltage VS. In the example of FIG. 1, a voltage divider consisting of resistors R12 and R13 reduces the auxiliary voltage $V_{AUX}$ to generate the sampling voltage VS.

The transformer T11 has a secondary side 120 with $N_S$ number of windings. The output voltage of the secondary side 120 is the output voltage $V_{OUT}$. The secondary side 120 generates a current $I_S$. The output voltage $V_{OUT}$ is coupled to a resistor R14, a capacitor C12 and a Schottky rectifier D12. The rectifier D12 has a forward voltage $V_{Z21}$, which may be approximately 0.35V. The resistor R14 serves as a preload. The secondary side 120 generates a current $I_{OUT}$ that flows through a load 122. As described herein, the load 122 has an impedance that may vary. Changes in the impedance of the load 122 change the current $I_{OUT}$ flowing through the load 122, which changes the power output of the power supply 100.

A controller 130 monitors the output voltage $V_{OUT}$ of the power supply 100 and controls the switching of the gate of transistor Q11 to maintain the output voltage $V_{OUT}$ constant. The output voltage $V_{OUT}$ is maintained constant across a varying output load by the controller 130 matching its power delivery to the load 122 at the output voltage $V_{OUT}$. The specific switching mode of transistor Q11 can then be referred as generating a specific output power level for a regulated output voltage $V_{OUT}$ into the load 122. In addition, by forcing a specific switching control on transistor Q11 a specific power delivery level can be forced that is independent of the output voltage $V_{OUT}$. The controller 130 has inputs coupled to the sampled voltage VS, the operating voltage VDD, and the current-sensing voltage $V_{CS}$. The controller 130 has an output DRV that drives the gate of transistor Q11 with a drive voltage $V_{DRV}$ in response to the inputs to the controller 130.

The power supply 100 is referred to as a primary side regulated (PSR) power supply because voltages and/or currents on the primary side 110 of the transformer T11 are sampled and/or regulated to control the output voltage $V_{OUT}$. PSR power supplies do not include the costs and complexity of feedback from the secondary side 120 of the transformer T11.

Figure 2:
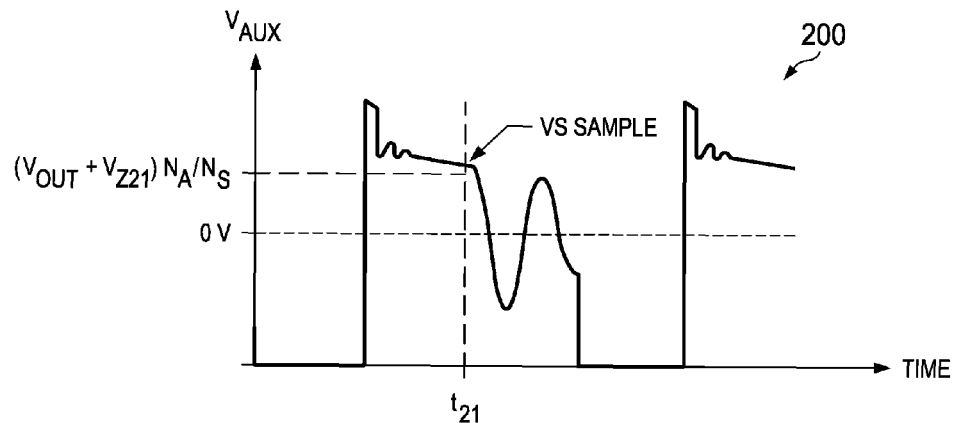
FIG. 2 is an example waveform of a sampled voltage in the power supply of FIG. 1.

FIG. 2 is a graph 200 showing an example of the auxiliary voltage $V_{AUX}$ as a function of time. During operation of the power supply 100, the auxiliary voltage $V_{AUX}$ is sampled once per switching cycle at the VS input to the controller 130. In the cycle of FIG. 2, the auxiliary voltage $V_{AUX}$ is sampled at a time $t_{21}$ and is equal to $(V_{OUT}+V_{Z21})N_A/N_S$. With additional reference to FIG. 1, the sampled voltage VS and/or the current $I_P$ are measured and used to regulate the output voltage $V_{OUT}$. For example, the controller 130 turns the transistor Q11 on and off at a switching frequency $f_{SW}$ for periods in response to the sampled voltage VS and/or the current $I_P$. The switching frequency $f_{SW}$ is high when high loads are drawn by the load 122 and the switching frequency $f_{SW}$ is lowered when light loads are drawn, such as when the power supply 100 is in a standby mode. A high switching frequency $F_{SW}$ is a switching frequency generated to drive a load in normal operation conditions outside of standby or light load conditions. In some examples the switching frequency of transistor Q11 may be modulated in addition to modulating the on-time of transistor Q11 to control the power and thus regulate the output voltage $V_{OUT}$ over varying load or input voltage conditions. This regulation of the output is referred to as the control loop of the power supply 100.

The switching frequency $f_{SW}$ of transistor Q11 and/or the period that transistor Q11 is on determines the output voltage $V_{OUT}$ for a given load. The switching frequency $f_{SW}$ and/or the period that the transistor Q11 is on changes as the impedance in the load 122 changes. For example, under heavy load conditions, the load 122 draws more current than in light load conditions, which drops the output voltage $V_{OUT}$, so the switching frequency $f_{SW}$ of the transistor Q11 is increased. When the power supply 100 operates in a no-load state, the load 122 draws little or no current or power. In this state, transistor Q11 conducts at a low switching frequency $f_{SW}$ to keep the voltage VDD high enough to operate the power supply 100. During the transitions between heavy and light loads, the switching frequency $f_{SW}$ has to be monitored to avoid over-voltage situations or avoid having the power supply 100 draw excessive current, both of which are inefficient.

Power supplies using primary side regulation (PSR) avoid the cost and component count of other power supplies using secondary feedback methods. The use of PSR is generally accompanied by the use of switching frequency fold back, which is used to maintain high operating efficiency at light loads and to reduce power consumption at no-load or standby conditions. Meeting standby power consumption targets requires switching frequencies $f_{SW}$ that are very low, such as 1 kHz-3 kHz for a typical 10 W AC/DC power supply. In the standby mode, the current drawn by the load 122 is zero or close to zero, but the power supply 100 operates at a finite load level that is the sum of a small internal preload (resistor R14) and the load imposed by the controller 130. The power supply 100 must be able to reduce its output power delivery to this low level or power regulation will be lost by the output voltage $V_{OUT}$ rising. Alternatively, the current drawn during standby can be increased by increasing the preload, which results in standby power consumption being increased.

With PSR, the power supply control loop has an inherent potential delay of $1/f_{SW}$ in its response to a change in the impedance of the load 122. During this delay, the output voltage $V_{OUT}$ of the power supply 100 undergoes a droop based on the level of the output current $I_{OUT}$ and the capacitance value of the output capacitor C12. If a large change in output current $I_{OUT}$ occurs at the beginning of this delay, then the droop can be unacceptably large. Increasing the size of the output capacitor C12 is undesirable because it increases the size and cost of the power supply 100.

Initial transient response from a static standby mode, absent of any additional feedback signals, is fundamentally limited by the delay of the period of the standby switching frequency $1/(f_{SW(ST)})$ in the standby mode. Generally, the standby switching frequency $f_{SW(ST)}$ varies proportionally to the total loading on the secondary side 120 during the standby mode. Therefore, optimizing a transient response for this situation must be accomplished by adjusting the preload while still keeping standby power below the maximum specification, which requires increasing the switching frequency $f_{SW}$ to the point that the delay of $1/f_{SW}$ results in acceptable transient responses.

Increasing the standby switching frequency $f_{SW(ST)}$ does not solve situations of repeating load transients where the loop response of the power supply 100 causes the output voltage $V_{OUT}$ to overshoot during the negative (load reduction, or load dump) transitions of the repeating transients. These voltage overshoots cause the controller 130 to generate the absolute minimum switching frequency $f_{SW(MIN)}$. This minimum switching frequency $f_{SW(MIN)}$ is typically lower than the standby switching frequency $f_{SW(ST)}$. If the ensuing positive transient edge occurs during this condition, the output voltage droop can be significantly large.

Figure 3:
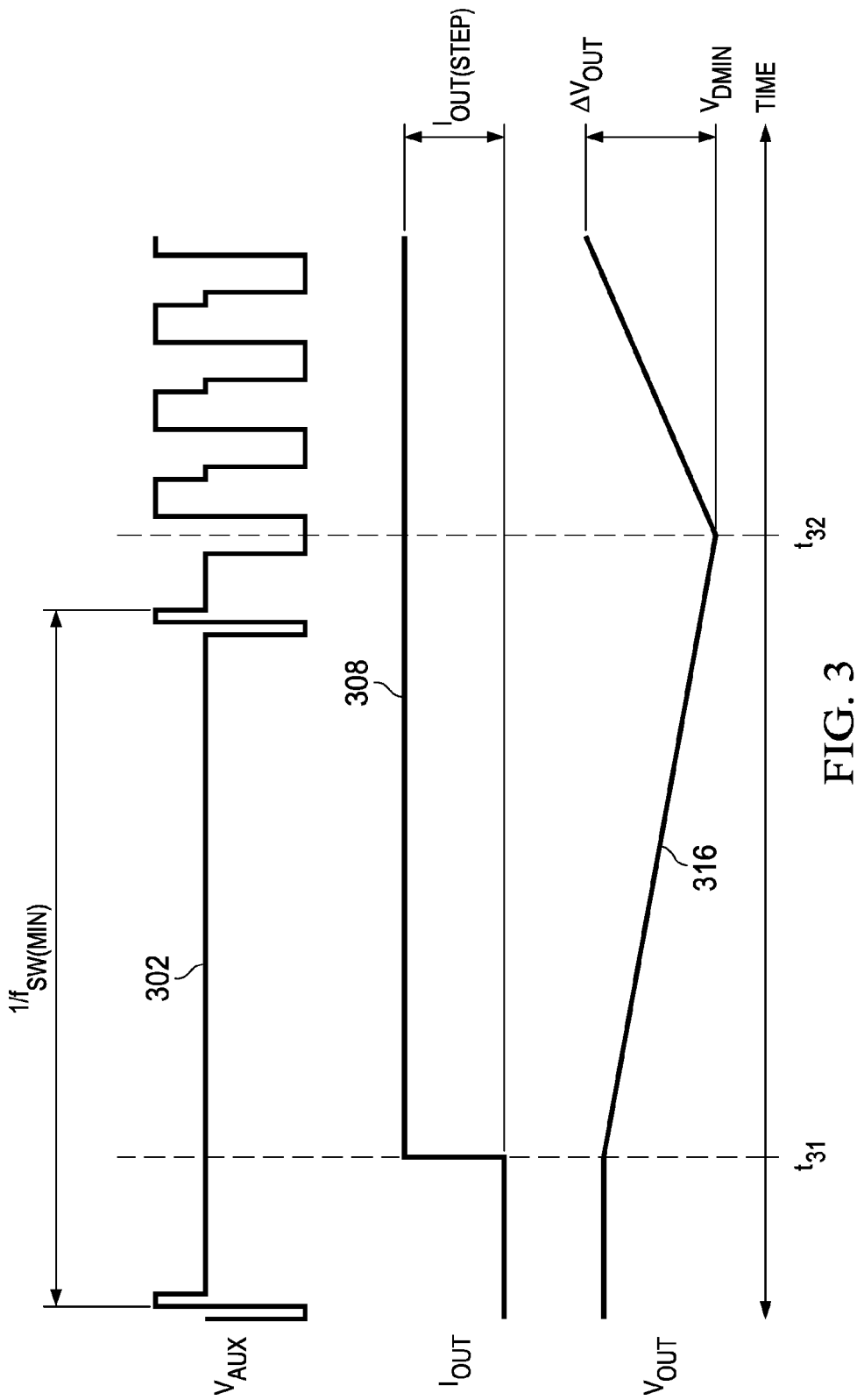
FIG. 3 is a timing diagram showing the problems resulting from switching frequencies in the power supply of FIG. 1.

FIG. 3 is a timing diagram showing the problems resulting from the switching frequencies described above. A graph 302 shows an example of the auxiliary voltage $V_{AUX}$ with a low to high frequency transition, which corresponds to a high to low period $1/f_{SW}$. During a low frequency period, the switching frequency $f_{SW}$ has reached the minimum switching frequency $f_{SW(MIN)}$ as shown by the graph 302. During the period of the minimum switching frequency $f_{SW(MIN)}$, the impedance of the load 122 has quickly increased, which causes the output current $I_{OUT}$ to undergo a step increase as shown at time $t_{31}$ on a graph 308. The change in the impedance of the load 122 causes the output voltage $V_{OUT}$ to start to decrease at time $t_{31}$ as shown by a graph 316, which is an example of the output voltage $V_{OUT}$ as a function of time. Due to the long period of the minimum switching frequency $1/f_{SW(MIN)}$, the output voltage $V_{OUT}$ undergoes a significant droop to a minimum droop voltage $V_{DMIN}$. The difference between the output voltage $V_{OUT}$ and the minimum droop voltage $V_{DMIN}$ is a voltage difference of $\Delta V_{OUT}$. The output voltage $V_{OUT}$ continues to decrease until a time $t_{32}$ is reached, which is a time when the auxiliary voltage $V_{AUX}$ resets or increases the switching frequency $f_{SW}$. In some examples, the output voltage $V_{OUT}$ is sampled during the end of the positive excursions of the voltage $V_{AUX}$ as shown in FIG. 2. The droop stops sometime after the first positive excursion (narrow pulse) when the control loop responds to the now known low output voltage $V_{OUT}$. The pulse widths in the auxiliary voltage $V_{AUX}$ are proportional to the peak primary current $I_P$. In these examples, the controller 130 serves to modulate both the current $I_P$ and the switching frequency $f_{SW}$. The droop described in FIG. 3 is the worst case that occurs when the transient occurs at the beginning of the $1/f_{SW}$ delay. The voltage difference $\Delta V_{OUT}$ of the above-described worst case droop is given by equation (1) as follows:

$$\Delta V_{OUT} = \frac{I_{OUT(STEP)}}{c_{12} \times f_{SW(MIN)}} \qquad \text{Equation (1)}$$

As shown by the graph 316, FIG. 3, the output voltage $V_{OUT}$ has undergone a significant droop for a significant period, which results in a significant voltage difference $\Delta V_{OUT}$. If the minimum switching frequency $f_{SW(MIN)}$ occurs repeatedly, the output voltage $V_{OUT}$ will undergo a series of droops and will be very unstable. For example, if the impedance of the load 122 continually changes, the output voltage $V_{OUT}$ will continually undergo the undesirable droop shown in graph 316.

Power supply controllers and methods of operating controllers that provide for adaptively maintaining high minimum switching frequencies when repeating load steps are applied to the output are disclosed herein. The high minimum switching frequency is fixed and improves the load transient response, such as reducing the minimum droop voltage level. The methods disclosed herein use a raised minimum switching frequency, referred to as a first minimum switching frequency $f_{SW(MIN1)}$, that is maintained unless the output voltage $V_{OUT}$ rises to a predetermined overshoot level, $V_{OUT(HI)}$. When the output voltage rises to the predetermined level $V_{OUT(HI)}$, a second minimum switching frequency $f_{SW(MIN2)}$ is generated, which lowers the output voltage $V_{OUT}$. The second minimum switching frequency $f_{SW(MIN2)}$ is also fixed. For a defined operating current level in the transistor Q11, the converter 130 can be shown to be delivering two defined power levels PRW (min1) and PWR(min2) at the first minimum switching frequency $f_{SW(MIN1)}$ and the second minimum switching frequency $f_{SW(MIN2)}$.

Figure 4:
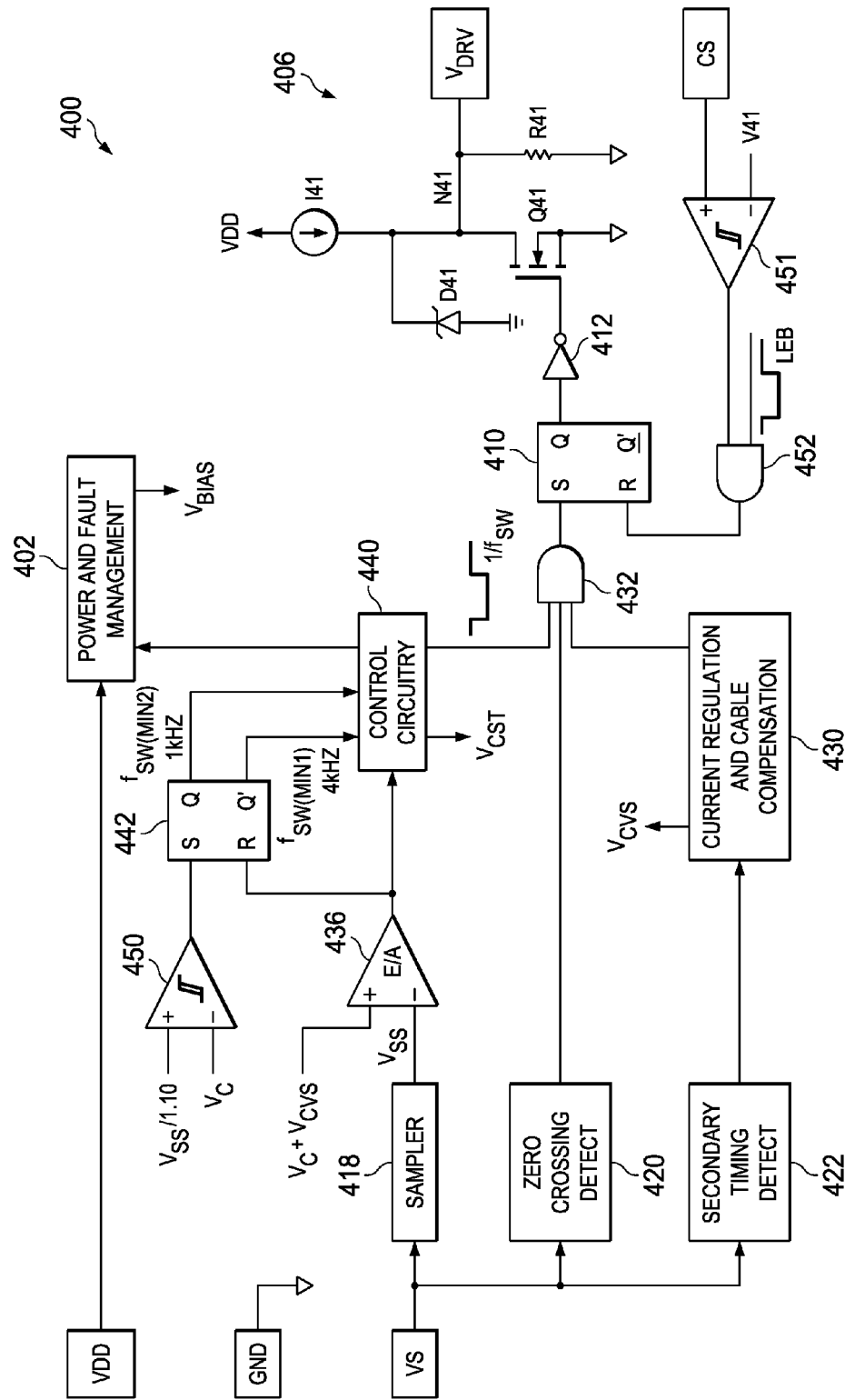
FIG. 4 is a schematic diagram of an example power supply controller.

FIG. 4 is a schematic diagram of an example power supply controller 400 that implements the improvements described herein. The controller 400 may be implemented as the controller 130 of FIG. 1 and may have fewer or more components than shown in FIG. 4. The controller 400 receives the voltage VDD and disperses it to power and fault management circuitry 402 and to drive circuitry 406. The circuitry 402 determines whether a fault exists in the power supply coupled to the controller 400 or within the controller 400 itself. A bias voltage $V_{BIAS}$ is output in response to this determination. The bias voltage $V_{BIAS}$ powers devices and/or components within the controller 400 and may be terminated if the circuitry 402 detects a fault.

The drive circuitry 406 drives a switch, such as the transistor Q11 of FIG. 1, by a drive voltage $V_{DRV}$ output at a drive node DRV, which regulates the output voltage $V_{OUT}$ of the power supply 100, FIG. 1. The drive circuitry 406 includes a current source I41 that is powered by the voltage VDD and is coupled to a node N41, which is also coupled to the drive node DRV, FIG. 1. In the example of FIG. 4, node N41 is coupled to a zener diode D41 that conceptually regulates or limits the drive voltage $V_{DRV}$. A switch, such as a transistor Q41 is coupled between node N41 and ground. Transistor Q41 receives a control signal to its gate from a latch 410. In the example of FIG. 4, a driver or inverter 412 is coupled between the latch 410 and the gate of transistor Q41. A resistor R41 is coupled in parallel with transistor Q41. During operation of the controller 400, the current generated by the current source I41 flows through transistor Q41 when the state of transistor Q41 is on or conducting. In this state, the drive voltage $V_{DRV}$ is zero or low. When the state of transistor Q41 is off or not conducting, the current generated by the current source I41 conducts through resistor R41 to generate the drive voltage $V_{DRV}$ to drive the gate of transistor Q11, FIG. 1.

The voltage VS is input to three devices: a sampler 418, a zero crossing detector 420, and a secondary timing detector 422. The sampler 418 samples the voltage VS and generates a sampled voltage $V_{SS}$. The zero crossing detector 420 detects zero crossing in the voltage VS and generates a signal upon detecting the zero crossing. The secondary timing detector 422 generates a signal that is input to current regulation and cable compensation circuitry 430. The circuitry 430 generates a compensation voltage $V_{CVS}$ and a compensation signal that is coupled to an input of an AND gate 432.

An error amplifier 436 amplifies the sampled voltage $V_{SS}$ with an offset of a constant voltage $V_C$ and the compensation voltage $V_{CVS}$. The constant voltage $V_C$ is a voltage that is related to an ideal or nominal output voltage $V_{OUT(NOM)}$. In the example of FIG. 4, the constant voltage $V_C$ is 4.05V, but it is a design choice and other values may be used. The output of the amplifier 436 is a signal that is indicative of the power output by a power supply being operated by the controller 400 and is coupled to the input of control circuitry 440 that sets the switching frequency of the power supply. In some examples, the output of the amplifier 436 is indicative of the output voltage of the power supply. The output of the amplifier 436 is also coupled to the reset input of a latch 442. As described in greater detail below, the latch 442 determines the minimum switching frequency $f_{SW(MIN)}$ generated by the controller 400. The controller 400 generates a first minimum switching frequency $f_{SW(MIN1)}$ and a second minimum switching frequency $f_{SW(MIN2)}$ in response to output power requirements of the power supply. In the example of FIG. 4, the first minimum switching frequency $f_{SW(MIN1)}$ is 4 KHz and the second minimum switching frequency $f_{SW(MIN2)}$ is 1 KHz.

A comparator 450 compares at least a portion of the sampled voltage $V_{SS}$ to the constant voltage $V_C$ described above. In the example of FIG. 4, the constant voltage $V_C$ is 4.05V and the sampled voltage $V_{SS}$ is divided by 1.1. The output of the comparator 450 is coupled to the set input of the latch 442. A high output on the Q output of the latch 442 instructs the control circuitry 440 to output the first minimum switching frequency $f_{SW(MIN1)}$ and a high output on the Q' output of the latch 442 instructs the control circuitry 440 to output the second minimum switching frequency $f_{SW(MIN2)}$. In the example of FIG. 4, the first minimum switching frequency $f_{SW(MIN1)}$ is higher than the second minimum switching frequency $f_{SW(MIN2)}$.

The current-sense signal CS is coupled to an input of a comparator 451 that compares the current-sense signal CS to a voltage V41. When the current-sense signal CS is greater than the voltage V41, the comparator 451 outputs a high signal to the input of an AND gate 452. A second input of the AND gate 452 is coupled to a leading edge blanking (LEB) signal. Leading edge blanking is a method for preventing the comparator 451 from responding to a leading edge spike on the current-sense signal CS. A spike is a result of the combination of the drive current from the node DRV and the discharge of a switch-node-to-ground capacitance. The output of the AND gate is coupled to the reset input of the latch 410.

Figure 5:
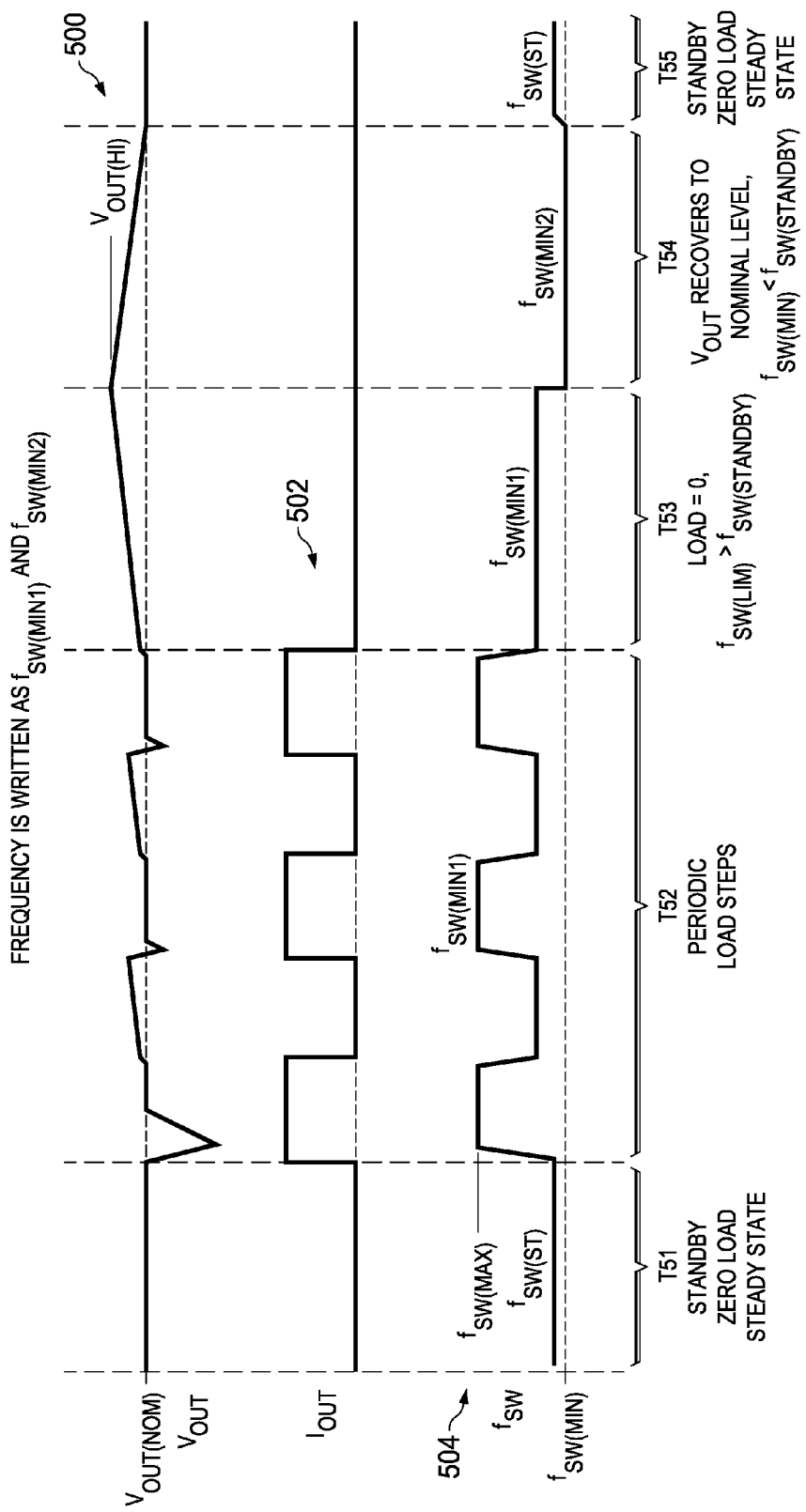
FIG. 5 is a plurality of timing diagrams showing example operations of the controller of FIG. 4.

FIG. 5 is a plurality of example timing diagrams showing the operation of the controller 400 of FIG. 4. The controller 400 maintains the output voltage $V_{OUT}$ as shown by a graph 500 when the output current $I_{OUT}$ is subjected to variations as shown by a graph 502. In some examples, the variations in current are variations in power required to be output by the power supply. Maintaining the output voltage $V_{OUT}$ is achieved by varying the switching frequency $f_{SW}$ as shown by a graph 504. The controller 400 generates a plurality of switching frequencies, with four of the switching frequencies shown in FIG. 4. The description herein focuses on two of these switching frequencies, the first minimum switching frequency $f_{SW(MIN1)}$ and the second minimum switching frequency $f_{SW(MIN2)}$. Standby switching frequencies $f_{SW(ST)}$ operate when the controller 400 is in a standby mode and high switching frequencies $f_{SW(HI)}$ operate when high current or power is drawn by the load 122 and the current may the fluctuate. The standby switching frequency $f_{SW(ST)}$ is between the first minimum switching frequency $f_{SW(MIN1)}$ and the second minimum switching frequency $f_{SW(MIN2)}$. The first and second minimum switching frequencies $f_{SW(MIN1)}$ and $f_{SW(MIN2)}$ are fixed frequencies built into the controller 400. The first minimum switching frequency $f_{SW(MIN1)}$ and the second minimum switching frequency $f_{SW(MIN2)}$ correspond to power levels PWR(min1) and PWR(min2), described above, that the power supply delivers to the output.

During a period T51, the power supply is operating in a standby mode, so the controller 400 generates the standby switching frequency $f_{SW(ST)}$. In the standby mode, there is no output current $I_{OUT}$ or very little output current $I_{OUT}$ and this condition has been ongoing for a period. Current is passed through the resistor R14, FIG. 1, to maintain operation of the controller 400.

During a period T52, the impedance of the load 122 undergoes several changes, which may be periodic and may be step functions. These changes in the impedance result in the output current $I_{OUT}$ and/or output power undergoing changes where it increases and decreases. In the example of FIG. 5, the output current $I_{OUT}$ is shown as undergoing periodic load steps during the period T52. During periods of high output current $I_{OUT}$, the controller 400 generates a high switching frequency $f_{SW(HI)}$. During periods between the high output current $I_{OUT}$, the controller 400 generates the first minimum switching frequency $f_{SW(MIN1)}$. This first minimum switching frequency $f_{SW(MIN1)}$ occurs after the high switching frequency $f_{SW(HI)}$ is generated to drive the high output current $I_{OUT}$ as shown in FIG. 5. During these transitions in the impedance of the load 122, the output voltage $V_{OUT}$ undergoes relatively small transient responses due to the first minimum switching frequency $f_{SW(MIN1)}$ being higher than a standby switching frequency or the second minimum switching frequency $f_{SW(MIN2)}$. It is noted that the output voltage $V_{OUT}$ continues to rise during periods when the controller 400 outputs the first minimum switching frequency $f_{SW(MIN1)}$.

At the start of a period T53, the output current $I_{OUT}$ has decreased. In the example of FIG. 5, the output current $I_{OUT}$ has dropped to zero. During the period T53, the controller 400 outputs the first minimum switching frequency $f_{SW(MIN1)}$ so that the controller 400 may return to outputting the high switching frequency $f_{SW(HI)}$ should the output current $I_{OUT}$ increase. During the period T53, the output voltage $V_{OUT}$ rises until it reaches a high voltage of $V_{OUT(HI)}$. When the output voltage $V_{OUT}$ reaches the high voltage of $V_{OUT(HI)}$, the controller 400 enters a period T54 which drops the switching frequency to the second minimum switching frequency $f_{SW(MIN2)}$. During the period T54, the output voltage $V_{OUT}$ drops. When the output voltage $V_{OUT}$ reaches the nominal output voltage $V_{OUT(NOM)}$, the switching frequency returns to the standby switching frequency $f_{SW(ST)}$ during period T55. Low standby power may be applied by the controller 400 in standby mode and the output voltage $V_{OUT}$ may be maintained at the nominal voltage $V_{OUT(NOM)}$. During the periods when the first and second minimum switching frequencies $f_{SW(MIN1)}$ and $f_{SW(MIN2)}$ are active, there may be a no-load condition on the output of the power supply 100.

Reference is made to FIGS. 1, 4, and 5 for a description as to the operation of the controller 400. The output voltage $V_{OUT}$ is measured by way of the voltage VS which is the voltage of the auxiliary winding 112, FIG. 1, of the transformer T1. In some examples, the output power is measured, which may be related to the output voltage $V_{OUT}$. The sampler 418 samples the voltage VS and generates the sampled voltage $V_{SS}$. The sampled voltage $V_{SS}$ is amplified by the amplifier 436 with offsets of the constant voltage VC and the compensation voltage $V_{CVS}$. The output of the amplifier 436, in some examples, is proportional to the operating power level of the power supply 100. The constant voltage VC corresponds to the nominal output voltage $V_{OUT(NOM)}$, which is the preferred output voltage. In some examples, the compensation voltage $V_{CVS}$ is not included in amplification of the sampled voltage $V_{SS}$. The output of the amplifier 436 is a linear voltage that is related to the sampled voltage $V_{SS}$. A low level output by the amplifier 436, in some examples, means that it has reached its lowest linear control level, which may be less than approximately 1.3V. This low level is sometimes referred to as a logic 0 with respect to the reset input of the latch 442.

If the sampled voltage $V_{SS}$ is less than the sum of the nominal output voltage $V_{OUT(NOM)}$ and the compensation voltage $V_{CVS}$, the amplifier 436 outputs a logic 1 to the control circuitry 440. The logic 1 indicates that the output voltage $V_{OUT}$ has fallen below the nominal output voltage $V_{OUT(NOM)}$, so the control circuitry 440 generates a high switching frequency $f_{SW(HI)}$. This situation is shown during the period T52 in graph 502 when the output current $I_{OUT}$ increases and the output voltage $V_{OUT}$ falls below the nominal output voltage $V_{OUT(NOM)}$. It is noted that the amplifier 436 outputs a linear voltage, which is decoded by the control circuitry 440 to generate high switching frequencies $f_{SW(HI)}$, which are higher than the first minimum switching frequency $f_{SW(MIN1)}$.

During periods when the output voltage $V_{OUT}$ exceeds the nominal output voltage $V_{OUT(NOM)}$, the amplifier 436 outputs a low voltage or logic 0 as described above. When the control circuitry 440 receives the low voltage from the amplifier 436, it defers to the outputs of the latch 442 in outputting the first and second minimum switching frequencies $f_{SW(MIN1)}$ and $f_{SW(MIN2)}$. The logic 0 is also input to the reset input of the latch 442, so the Q and Q' outputs of the latch 442 depend on the logic level at the set input. The set input of the latch 442 is coupled to the output of the comparator 450, which determines if the output voltage $V_{OUT}$ is above or below the high output voltage $V_{OUT(HI)}$. The comparator 450 compares the constant voltage VC, which is representative of the nominal output voltage $V_{OUT}$ (NOM), to the sampled voltage $V_{SS}/1.10$, which correlates to the high output voltage $V_{OUT(HI)}$. It is noted that the sampled voltage $V_{SS}$ may be divided by other values and that 1.10 is an example of a design choice. When the voltage $V_{SS}/1.10$ is less than the constant voltage VC, the comparator 450 outputs a logic 0, meaning that the output voltage $V_{OUT}$ has not reached the high output voltage $V_{OUT(HI)}$ as shown by the period T53 in FIG. 5. In this state, the comparator 450 outputs a logic 0, so the set and reset inputs to the latch 442 are logic 0. In this state, the Q output is logic 0 and the Q' output is a logic 1, which causes the control circuitry 440 to generate the first minimum switching frequency $f_{SW(MIN1)}$. When the voltage $V_{SS}/1.10$ exceeds, or in some situations, is equal to, the constant voltage VC, the output voltage $V_{OUT}$ has reached the high output voltage $V_{OUT(HI)}$ as shown at the beginning of period T54. In this state, the comparator 450 outputs a logic 1 to the set input of the latch 442, so the Q output transitions to logic 1 and the Q' output transitions to logic 0. This state causes the control circuitry 440 to generate the second minimum switching frequency $f_{SW(MIN2)}$. After a predetermined period generating the second minimum switching frequency $f_{SW(MIN2)}$, the control circuitry 450 generates the standby switching frequency $f_{SW(ST)}$. The period that the controller 400 generates the second minimum switching frequency $f_{SW(MIN2)}$ may be determined in different manners. In some examples, the period is related to the time it takes the output voltage $V_{OUT}$ to relax to the nominal output voltage $V_{OUT(NOM)}$. This period is a function of several variables, including the capacitance of the output capacitor C21, FIG. 1, the standby load current, the second minimum switching frequency $f_{SW(MIN2)}$, and the voltage difference between $V_{OUT(HI)}$ and $V_{OUT(NOM)}$. In some embodiments, the standby frequency $f_{SW(ST)}$ is generated when the output voltage $V_{OUT}$ reaches the nominal output voltage $V_{OUT(NOM)}$.

Figure 6:
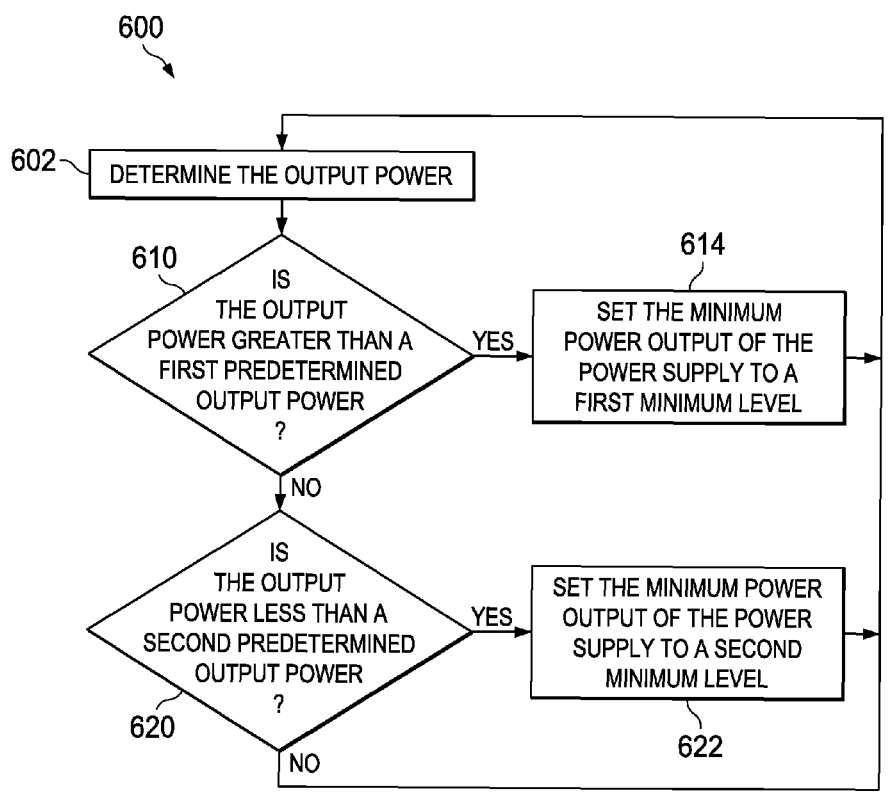
FIG. 6 is a flow diagram describing an example of the operation of the controller of FIG. 4.

FIG. 6 is a flow diagram 600 describing an example of the operation of the controller of FIG. 4. The method described in the flowchart 600 is based on output powers of the power supply 100. In block 602, the output power of the power supply 100 is determined. This determination may be accomplished by analyzing the output of the amplifier 436, which may be determined by measuring the output voltage $V_{OUT}$. Processing proceeds to decision block 610 were a determination is made as to whether the output power is greater than a first predetermined power. This first predetermined power is indicative of the power supply 100 operating in a manner where high current is output as shown in the graph 502. If the outcome of decision block 610 is affirmative, processing proceeds to block 614 where a high power is enabled to be output by the power supply 100. The high power may include setting the peak of the current $I_P$. In response to the power setting, the minimum switching frequency is set to the first minimum switching frequency to the first minimum switching frequency $f_{SW(MIN1)}$.

If the output of the decision block 610 is negative, processing proceeds to decision block 620 where a determination is made as to whether the output power is less than a second predetermined power. If so, processing proceeds to block 622 where the minimum output power is set to a second power, which is less than the first power. This may be achieved by setting the peak of the current $I_P$. In response to the determination the minimum switching frequency is set to the second minimum switching frequency $f_{SW(MIN2)}$.

Figure 7:
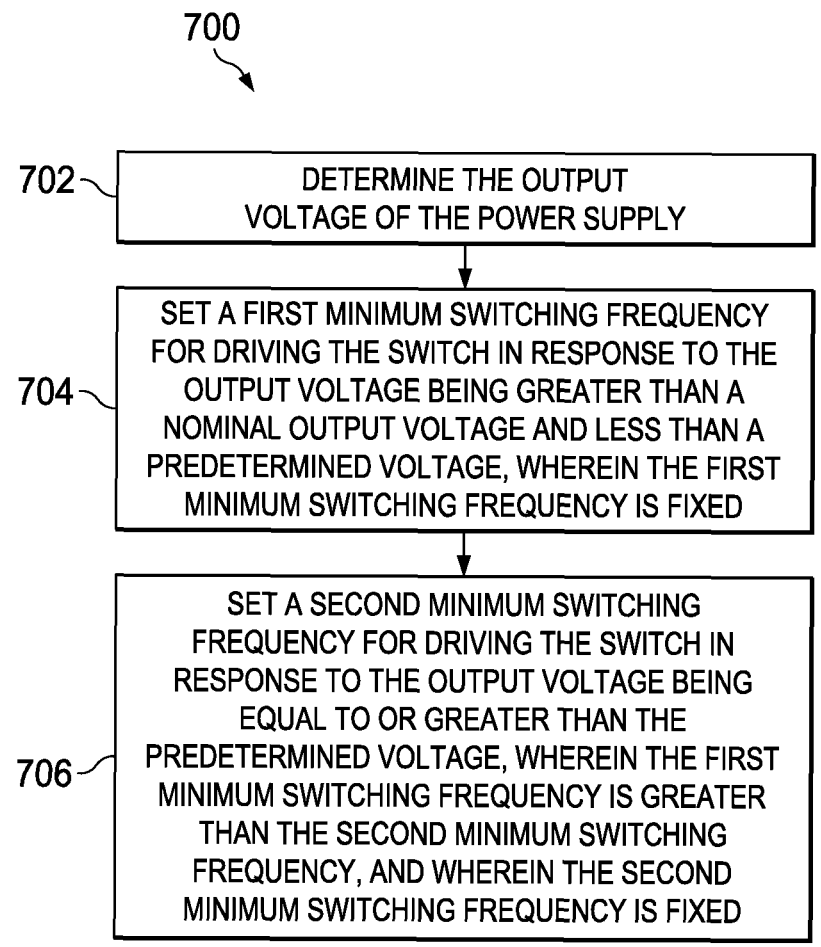
FIG. 7 is a flow diagram describing another example of the operation of the controller of FIG. 4.

FIG. 7 is a flow diagram 700 describing another example of the operation of the controller of FIG. 4. In block 702, the output voltage of the power supply is determined. In block 704, a first minimum switching frequency for driving the switch is set in response to the output voltage being greater than a nominal output voltage and less than a predetermined voltage. The first minimum switching frequency is fixed. In block 704, a second minimum switching frequency for driving the switch is set in response to the output voltage being equal to or greater than the predetermined voltage. The first minimum switching frequency is greater than the second minimum switching frequency and the second minimum switching frequency is fixed.

In other example controllers, different methods may be implemented to control the first and second minimum switching frequencies $f_{SW(MIN1)}$ and $f_{SW(MIN2)}$. For example, the first minimum switching frequency $f_{SW(MIN1)}$ may be applied for a set period of time. In this example, the output voltage $V_{OUT}$ may be clamped to keep it from rising too high. The same may be applied to the second minimum switching frequency, which may continue for a set time or until a predetermined output voltage is reached.

While some examples of power supply controllers and power supplies have been described in detail herein, it is to be understood that the inventive concepts may be otherwise variously embodied and employed and that the appended claims are intended to be construed to include such variations except insofar as limited by the prior art.

What is claimed is:

1. A method of operating a switching power supply, the power supply having a transformer and a switch coupled to the primary side of the transformer for controlling the current flow through the primary side of the transformer, the method comprising:
   determining the output power of the power supply;
   setting a first minimum output power of the power supply in response to the output power being greater than a first predetermined power; and
   setting a second minimum output power of the power supply in response to the output power being less than a second predetermined power.

2. The method of claim 1, further comprising setting a first minimum switching frequency for driving the switch in response to setting the first minimum output power and setting a second minimum switching frequency for driving the switch in response to setting the second minimum power.

3. A method of operating a switching power supply, the power supply having a transformer and a switch coupled to the primary side of the transformer for controlling the current flow through the primary side of the transformer, the method comprising:
   determining the output voltage of the power supply;
   setting a first minimum switching frequency for driving the switch in response to the output voltage being greater than a nominal output voltage and less than a predetermined voltage, wherein the first minimum switching frequency is fixed; and
   setting a second minimum switching frequency for driving the switch in response to the output voltage being equal to or greater than the predetermined voltage, wherein the first minimum switching frequency is greater than the second minimum switching frequency, and wherein the second minimum switching frequency is fixed.

4. The method of claim 3, wherein setting the second minimum switching frequency comprises maintaining the second minimum switching frequency until the output voltage reaches the nominal output voltage.

5. The method of claim 3, wherein setting the second minimum switching frequency comprises maintaining the second minimum switching frequency for a predetermined period.

6. The method of claim 3, further comprising generating a high switching frequency in response to the output voltage being less than the nominal output voltage, wherein the high switching frequency is higher than the first minimum switching frequency, and wherein the high switching frequency varies in response to changes in the output voltage.

7. The method of claim 3, further comprising generating at least one standby switching frequency in response to the output voltage being equal to the nominal output voltage, the standby switching frequency being less than the second minimum switching frequency.

8. The method of claim 3, further comprising generating at least one standby switching frequency in response to the power supply entering a standby mode, wherein the at least one standby switching frequency is less than the second minimum switching frequency.

9. The method of claim 3, wherein the output voltage increases in response to the switch being driven at the first minimum switching frequency.

10. The method of claim 3, wherein the output voltage decreases in response to the switch being driven at the second minimum switching frequency.

11. A controller for controlling a switch of a switching power supply, the power supply having a transformer, wherein the switch controls the current flow through the primary side of the transformer, the controller comprising:
   voltage measuring circuitry for determining the output voltage of the power supply; and
   a frequency controller that sets a first minimum switching frequency for driving the switch in response to the output voltage being greater than a nominal output voltage and less than a predetermined voltage, the first switching frequency being fixed, and a second minimum switching frequency for driving the switch in response to the output voltage being equal to the predetermined voltage, the second minimum switching frequency being fixed, and the first minimum switching frequency being greater than the second minimum switching frequency.

12. The controller of claim 11, further comprising latch circuitry coupled to the frequency controller, the latch circuitry causing the frequency controller to maintain the second minimum switching frequency until the output voltage reaches a predetermined voltage.

13. The controller of claim 12, wherein the predetermined voltage is the nominal output voltage.

14. The controller of claim 11, wherein the frequency controller further generates a high switching frequency in response to the output voltage being less than the nominal output voltage, the high switching frequency being higher than the first minimum switching frequency.

15. The controller of claim 11, wherein the frequency controller generates at least one standby switching frequency in response to the output voltage being equal to the nominal output voltage, the standby switching frequency being less than the second minimum switching frequency.

16. The controller of claim 11, wherein the frequency controller generates at least one standby switching frequency in response to the power supply entering a standby mode, wherein the standby switching frequency is less than the second minimum switching frequency.

17. A power supply comprising:
   a transformer having a primary side and a secondary side, the secondary side coupled to the output of the power supply;
   a switch coupled to the primary side of the transformer, wherein the switch controls the current flow through the primary side of the transformer;
   a controller comprising:
      an output coupled to the switch for controlling the state of the switch;
      voltage measuring circuitry for determining the output voltage of the power supply; and
      a frequency controller for setting a first minimum switching frequency for driving the switch in response to the output voltage being greater than a nominal output voltage and less than a predetermined voltage, the first minimum switching frequency being fixed, and a second minimum switching frequency for driving the switch in response to the output voltage being equal to the predetermined voltage, the second minimum switching frequency being fixed, and the first minimum switching frequency being greater than the second minimum switching frequency.

18. The power supply of claim 17, further comprising latch circuitry coupled to the frequency controller, the latch circuitry causing the frequency controller to maintain the second minimum switching frequency until the output voltage reaches a predetermined voltage.

19. The power supply of claim 17, wherein the predetermined voltage is the nominal output voltage.

20. The power supply of claim 17, wherein the frequency controller further generates at least one high switching frequency in response to the output voltage being less than the nominal output voltage, the high switching frequency being greater than the first switching frequency.

* * * * *